Nov. 16, 1948. C. CHISHOLM 2,453,782
STRIP PERFORATING APPARATUS
Filed June 14, 1946 10 Sheets-Sheet 1

Nov. 16, 1948.  C. CHISHOLM  2,453,782
STRIP PERFORATING APPARATUS
Filed June 14, 1946  10 Sheets-Sheet 6

Inventor:
Clifton Chisholm
By: Wallace and Cannon
Attorneys

Nov. 16, 1948.  C. CHISHOLM  2,453,782
STRIP PERFORATING APPARATUS
Filed June 14, 1946  10 Sheets-Sheet 8

Inventor:
Clifton Chisholm
By Wallace and Cannon
Attorneys.

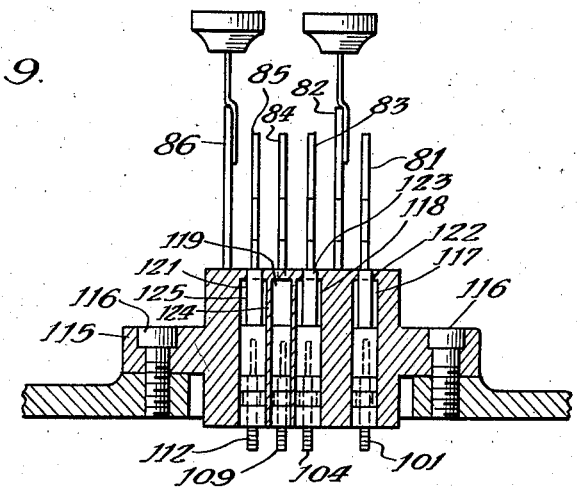
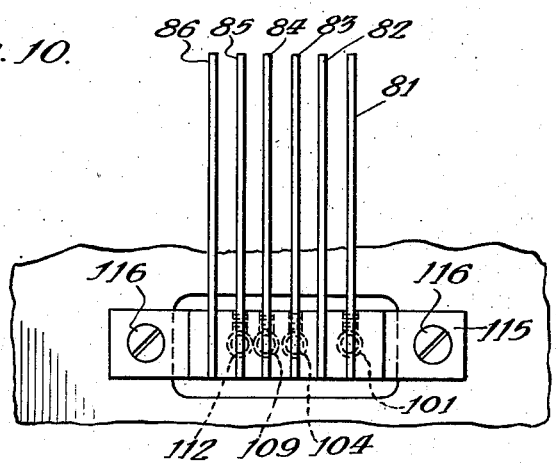
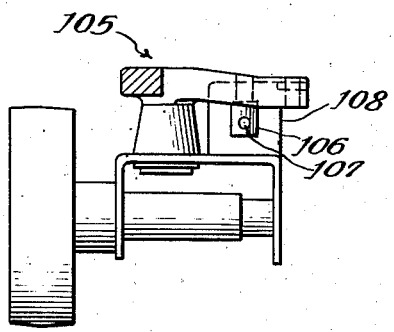

Nov. 16, 1948.　　　　C. CHISHOLM　　　　2,453,782
STRIP PERFORATING APPARATUS
Filed June 14, 1946　　　　　　　　　　10 Sheets-Sheet 10
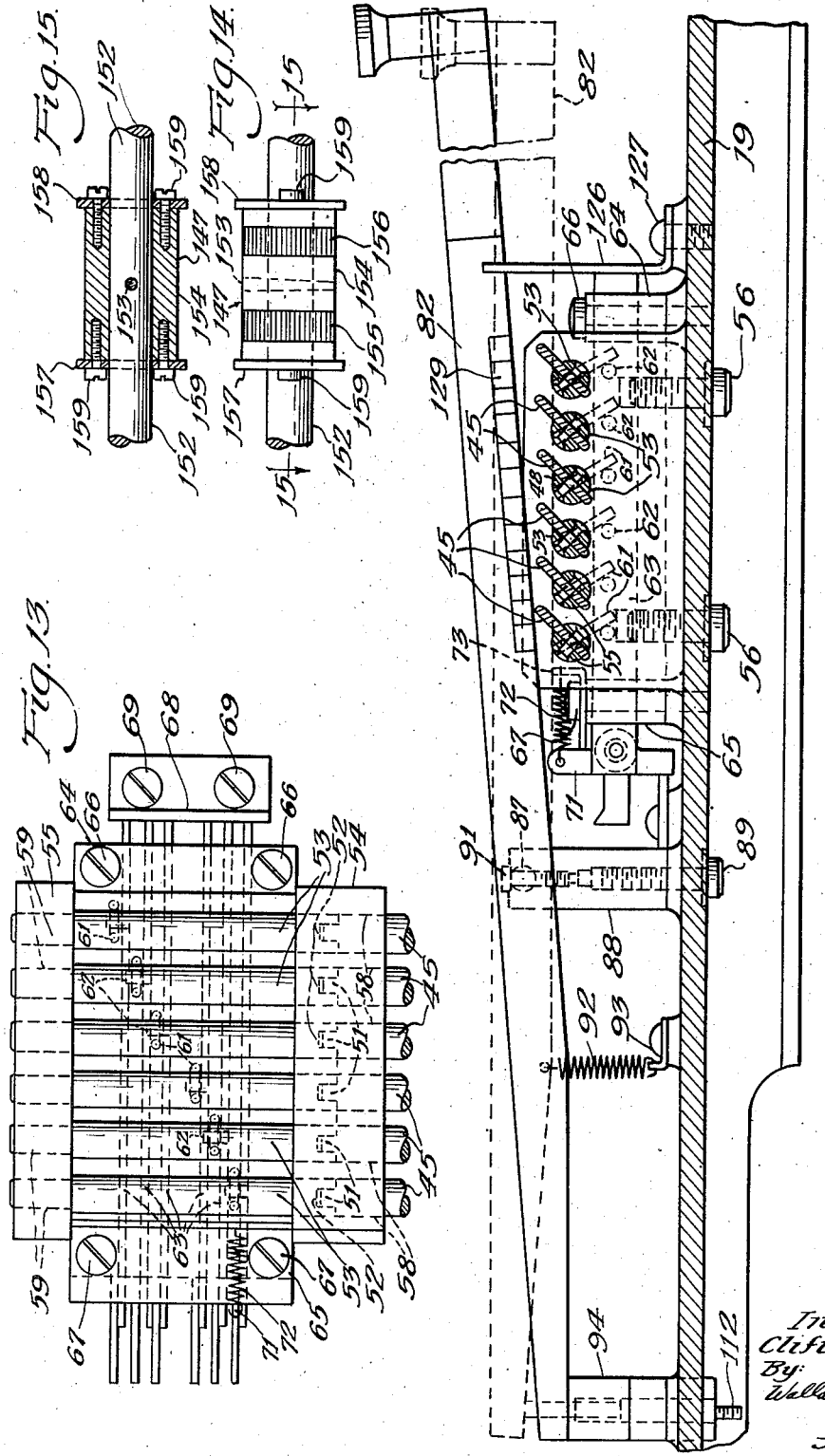
Inventor:
Clifton Chisholm
By:
Wallace and Cannon
Attorneys Patented Nov. 16, 1948

2,453,782

UNITED STATES PATENT OFFICE 2,453,782

STRIP PERFORATING APPARATUS

Clifton Chisholm, Forest Hills, N. Y., assignor to Addressograph-Multigraph Corporation, Cleveland, Ohio, a corporation of Delaware Application June 14, 1946, Serial No. 676,779

11 Claims. (Cl. 164—112)

This invention relates to a strip perforating apparatus and more particularly to an apparatus controlled by the operation of a typewriter keyboard for forming in a tape, strip of paper, or the like, perforations arranged according to a predetermined code. The strip bearing such perforations is to be used subsequently in controlling other apparatus to reproduce mechanical and automatic operations which are normally performed manually.

In business offices where peak work loads appear periodically it is desirable to be able to anticipate at least part of such peaks and to take advantage of automatic machinery which can operate constantly day and night to avoid the necessity of employing large numbers of workers for limited periods. By the use of automatic machinery of the type to which my invention pertains it is possible to take care of peak loads without extraordinary temporary increases in the number of employees or in the quantity of machinery required.

A specific example of a business one aspect of which is highly periodic in volume is the business of publishing and distributing magazines and other periodicals which are sold largely on an annual subscription basis. Subscription lists for the more popular periodicals commonly run into the hundreds of thousands and some run into millions. In some cases a very large proportion of subscriptions tend to be received or to expire and be renewed at a particular season of the year, especially at or near the end of the calendar year. The preparation of new mailing lists at such times is a tremendous task involving the preparation of devices for use in mailing and/or addressing machines, the preparation of renewal notices, issue of receipts and the like. To handle such a large volume of business requires either that there be a large emergency force of employees and a large amount of mechanical equipment employed for a relatively short time or that the volume of work be spread over a longer period. Either of these alternatives is highly objectionable.

An important factor contributing to the difficulties mentioned above is the immense amount of time and labor involved in preparing devices for use in automatic addressing machines and analogous equipment. For each listed subscription a new name, a new address, usually a new expiration date, and sometimes additional matter are involved. For each customer a printing device such as an address plate must be prepared and this is normally done on a manually controlled machine. Commonly printing devices of the character mentioned embody a metal plate of well-known type which is adapted to be embossed on a machine which is operated in a manner similar to that in which a typewriter is operated. An example of a machine of the type mentioned is shown in Duncan Patent No. 1,518,904, patented December 9, 1924.

As indicated above the work of preparing plates of the character mentioned is enormous when it is realized that one plate must be prepared for each of the many thousands or millions of customers. The preparation of a single plate involves feeding the plate to a holding device, operating keys to emboss the name, address, etc. on the plate in a manner very similar to that in which a typewriter is operated, removing the plate from the machine and placing it in appropriate stack or file, and repeating the operation for each subsequent name on the subscription list.

Plate embossing machines of the type shown in the Duncan Patent No. 1,518,904 mentioned above are highly satisfactory for their purpose and no superior device has yet been contrived to take their place. These machines, however, due to their inherent nature, are somewhat slow and ponderous in operation. The strength of parts required for embossing operations demands that such parts be made heavy and strong. Hence machines of this type must necessarily be somewhat deliberate and slow in operation. Although operated by the same keyboard which is used on standard typewriters the speed of a plate embossing machine is much less than that of a typewriter operated by an average typist. Hence the production of large quantities of addressing plates constitutes a serious bottleneck when it occurs with seasonal peak loads.

Since the standard plate embossing machine, as exemplified in the Duncan patent referred to above, utilizes the same keyboard and other manual controls such as word spacing, shifting from lower case to upper case, line spacing and carriage return, I have discovered that it is possible to provide a code bearing tape which may be produced by operating the keys and other manual controls of a standard typewriter. By the use of a tape perforated by my apparatus it is possible to automatically control a plate embossing machine of the character mentioned above so that long mailing lists may be embossed on suitable printing devices, for use in automatic addressing equipment and the like without requiring manual operations. Because of the greater speed with which a typewriter may be operated, my invention makes it possible to prepare a code bearing strip by the operation of a typewriter keyboard which will control the plate embossing machine automatically and eliminate the large volume of manual work which would otherwise be required to emboss a large number of printing devices.

By the use of a perforated tape prepared as described above it is possible to operate plate embossing machines day and night during periods where the work load is at a peak without necessitating the hiring of large numbers of temporary employees or the use of a large number of plate embossing machines and related equipment. My new tape perforating mechanism makes it possible to prepare the necessary control tape rapidly and to save considerable time and expense in the eventual preparation of the necessary printing devices for subscription lists.

It is therefore an object of my invention to accomplish the punching of groups of perforations in a control strip, tape or the like according to a predetermined code by the manipulation of the keyboard and other manual controls of a standard typewriter.

More specifically it is an object of my invention to accomplish the punching of perforations in a control strip, tape or the like according to a predetermined code by connecting necessary code interpreting elements and punch control devices to the keyboard of a standard typewriting machine in a manner which will not interfere with the normal use and operation of such typewriting machine.

It is a further object of my invention to accomplish the forming of perforations in a control strip, tape or the like according to a predetermined code by mounting a self-powered cyclically operated perforation mechanism adjacent the standard typewriting machine and connecting a set of control elements between the keys and other manual controls of said typewriting machine and the cyclically operated perforating mechanism. It is a further object of my invention to accomplish the foregoing in a manner such that the operations incident to normal function of a typewriter including line spacing, word spacing, shifting from lower case to upper case and the like will be communicated in code to the punching mechanism and incorporated as a group of perforations conforming to said predetermined code in the control strip or tape. My invention contemplates that the tape so perforated will be used later for controlling the operation of a machine which embosses printing devices such as embossable plates used in addressing machines and the like, the latter however forming no part of the present invention. An apparatus which is controlled by a code bearing strip or tape produced as above for operating or controlling the operations of a plate embossing machine forms the subject matter of a separate application filed by me Serial No. 676,778, filed June 14, 1946.

Other and additional objects of my invention are to provide control means for punching or perforating apparatus which can be readily adapted to a standard typewriter without affecting its normal operation and without requiring any important structural modifications to said typewriter, to provide means for feeding a strip or tape to and through the perforating or punching mechanism, to rewind the punched or perforated tape for subsequent use in a machine where the strip or tape will be used for automatic control purposes, and to accomplish all the foregoing by the use of a relatively simple and compact organization of mechanical elements operated automatically and imposing no appreciable burden on the normal manual operation of the typewriting machine which controls the perforating or punching operations.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 2:
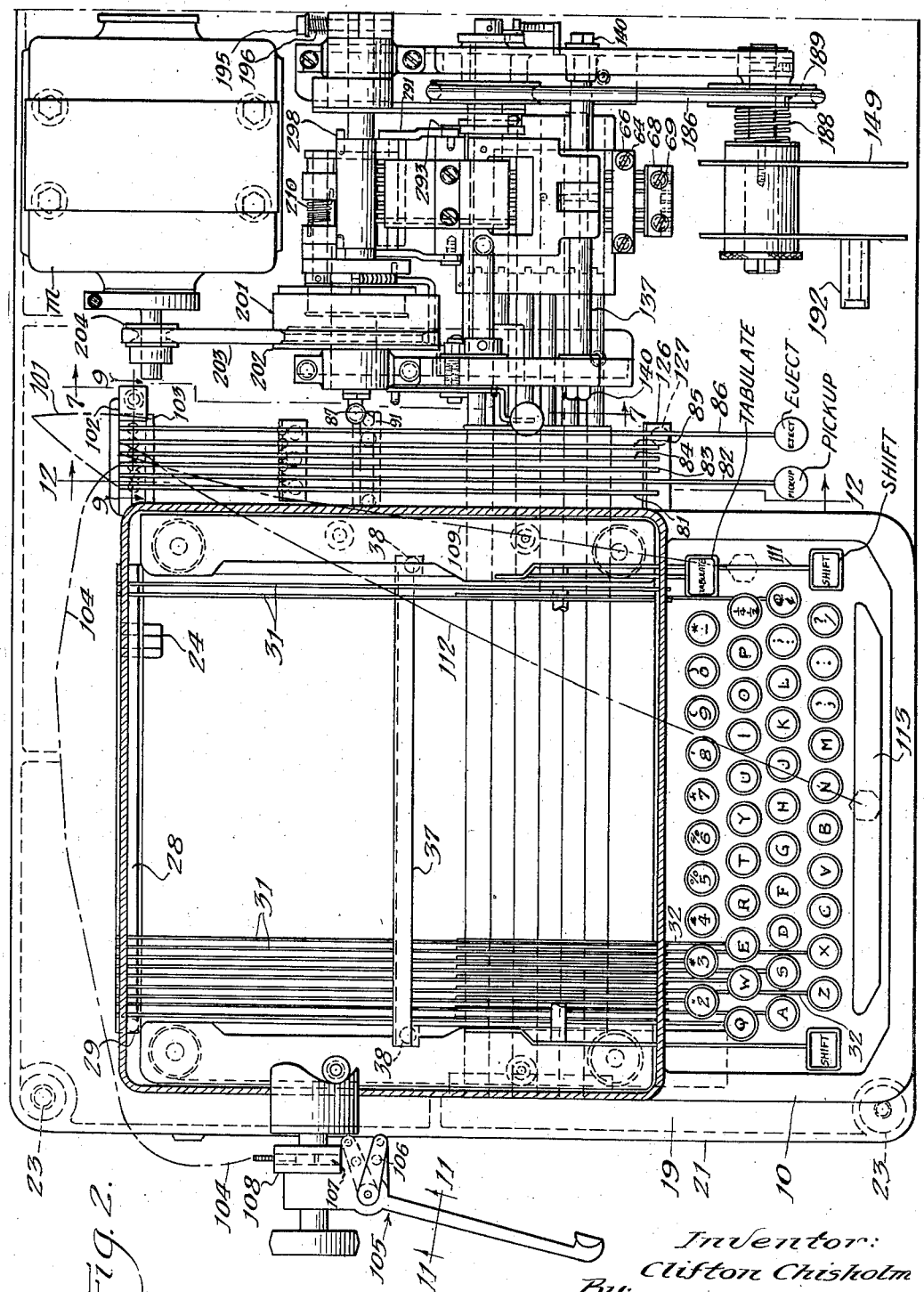
Fig. 2 is a plan view of the same, certain parts being broken away and certain other parts being shown in section to show more clearly the construction of certain operating mechanisms.
Figure 3:
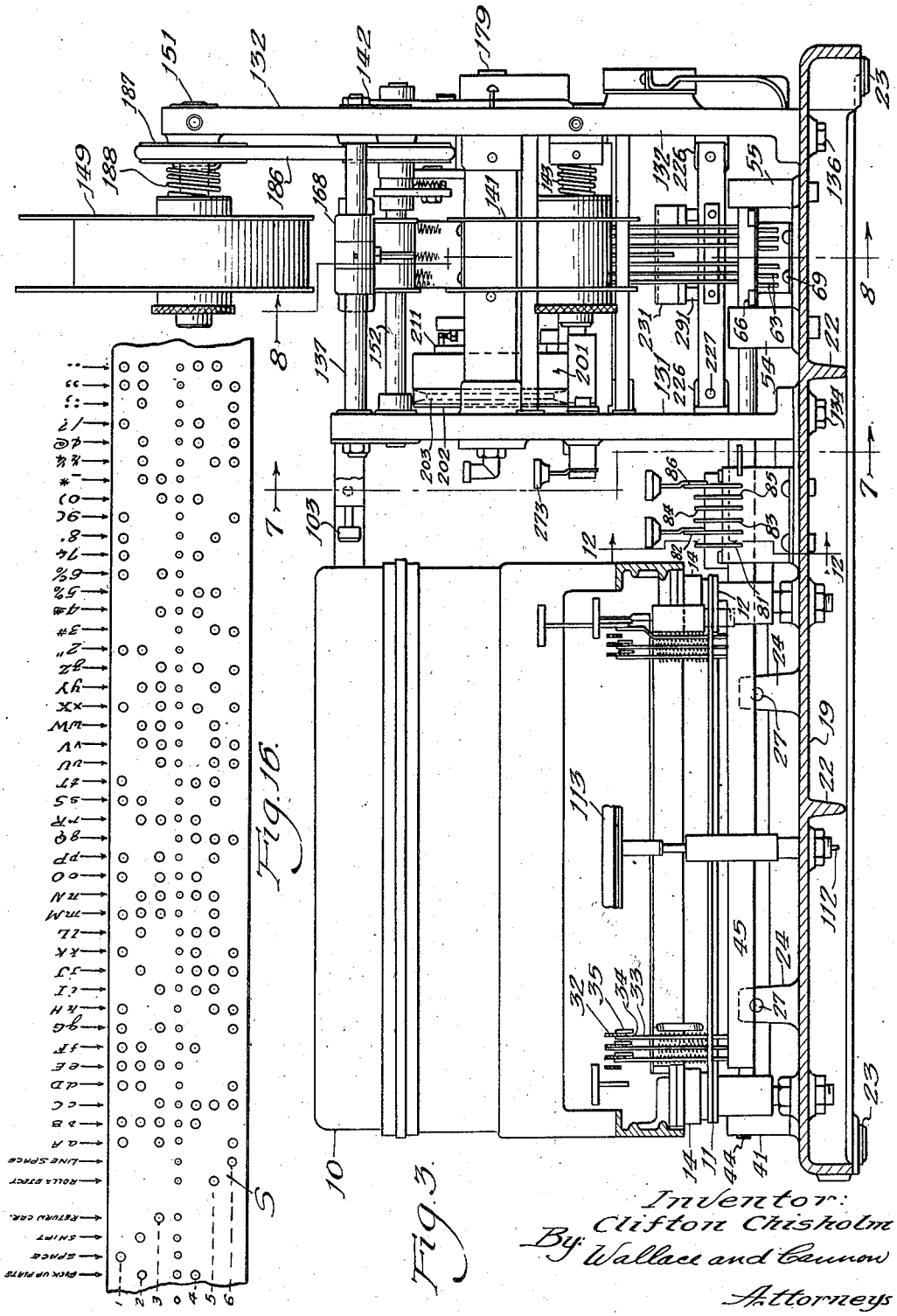
Fig. 3 is a front elevational view, certain parts being broken away and certain other parts being shown in section.
Figure 4:
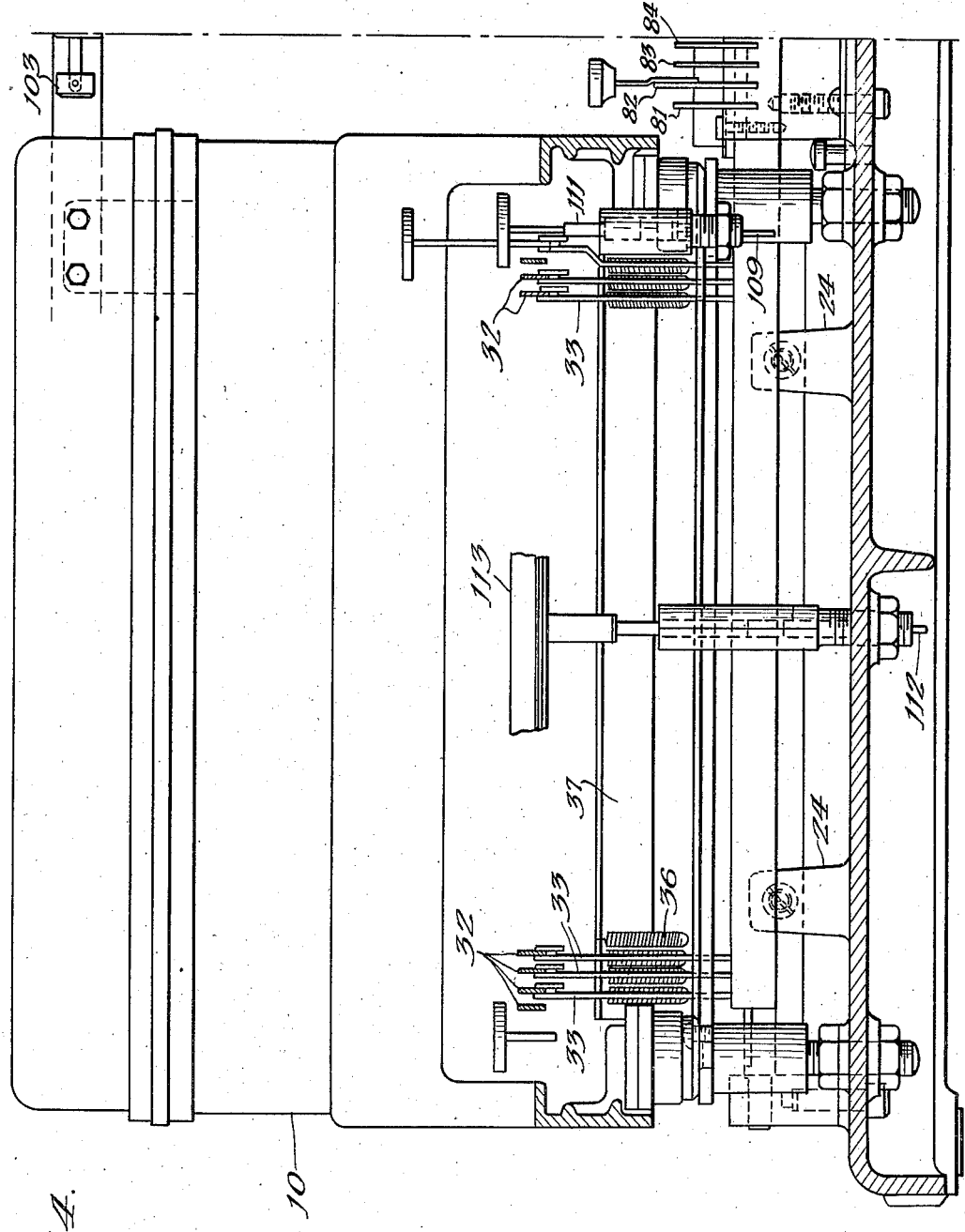
Figure 5:
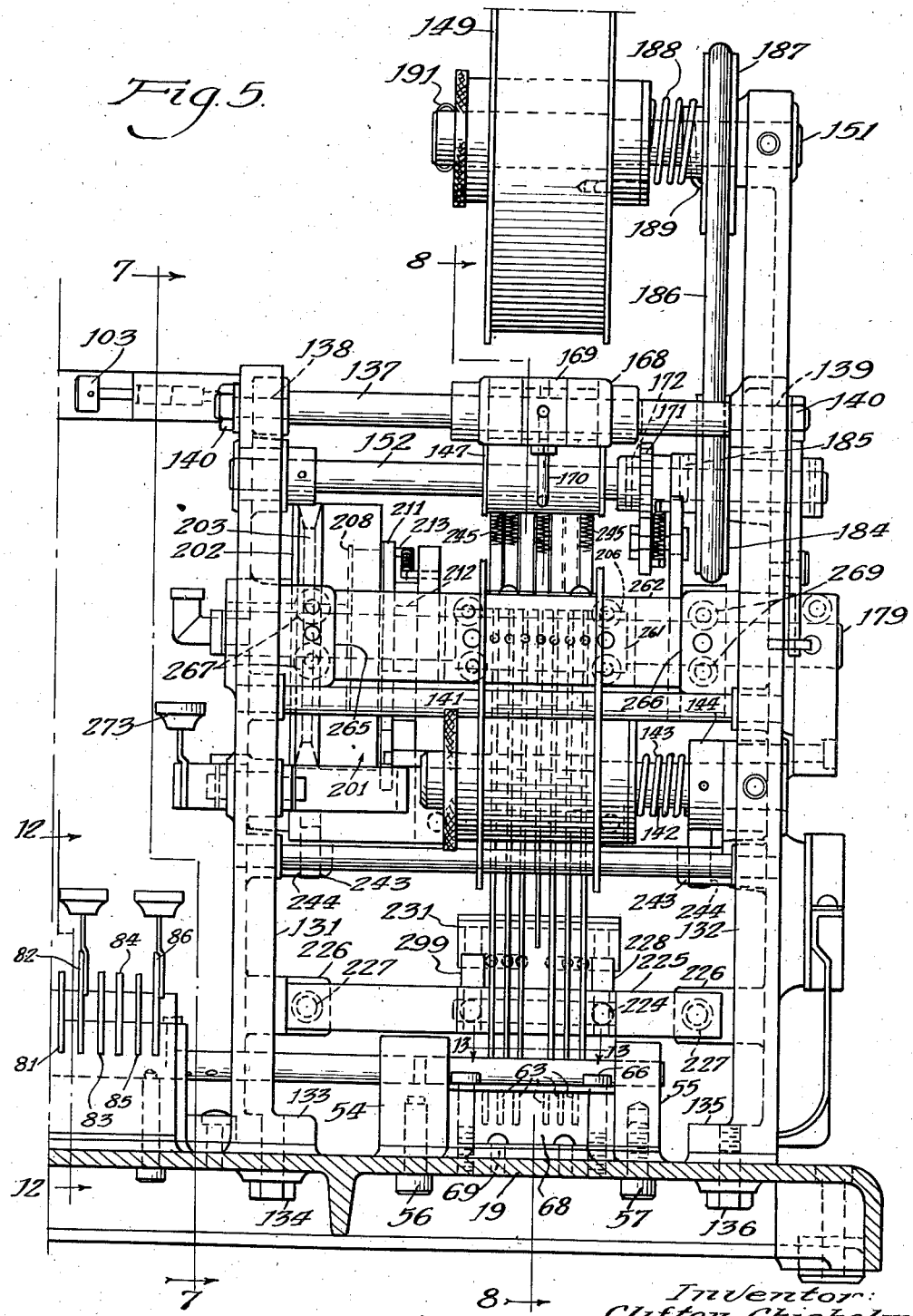
Figure 6:
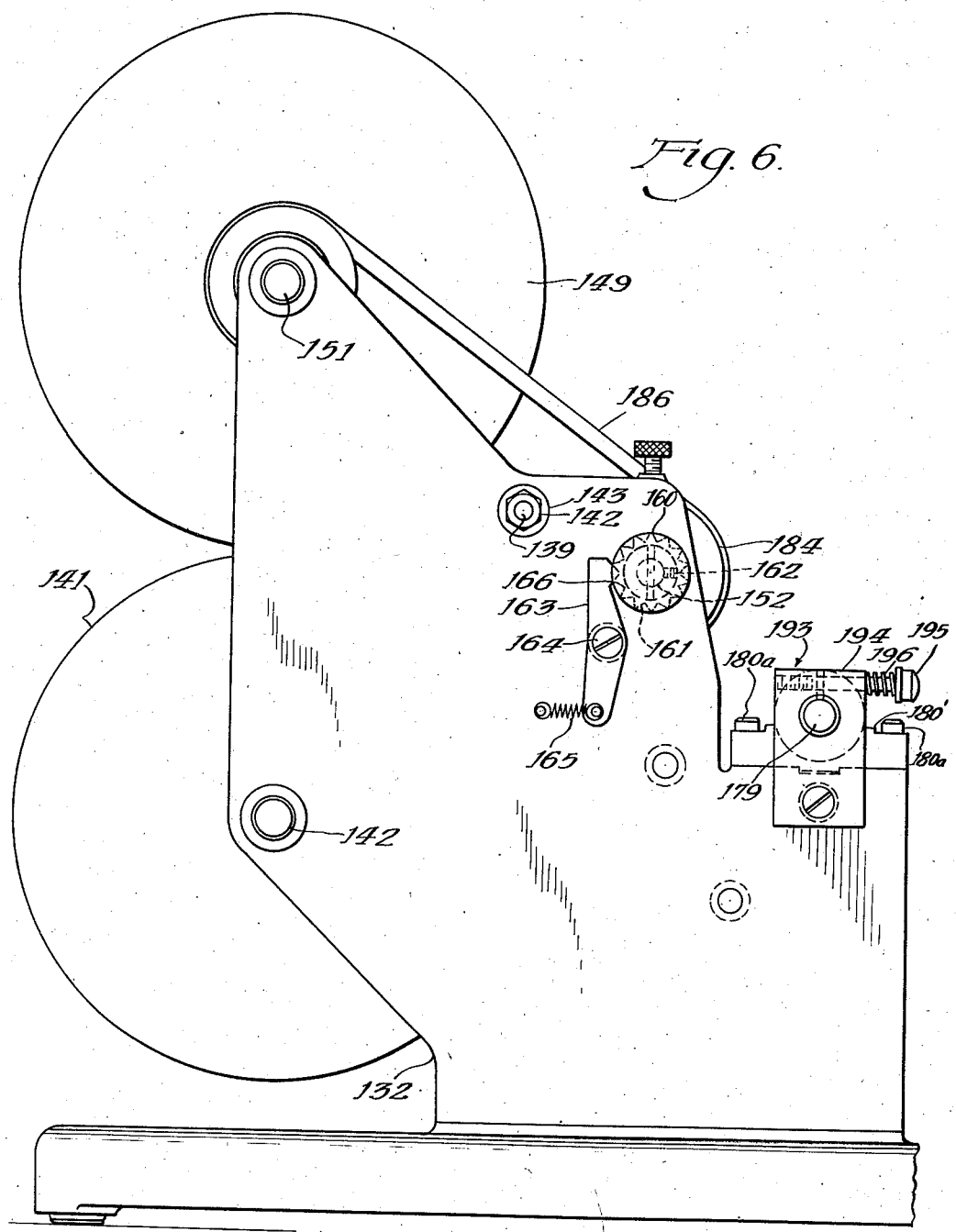
Figure 7:
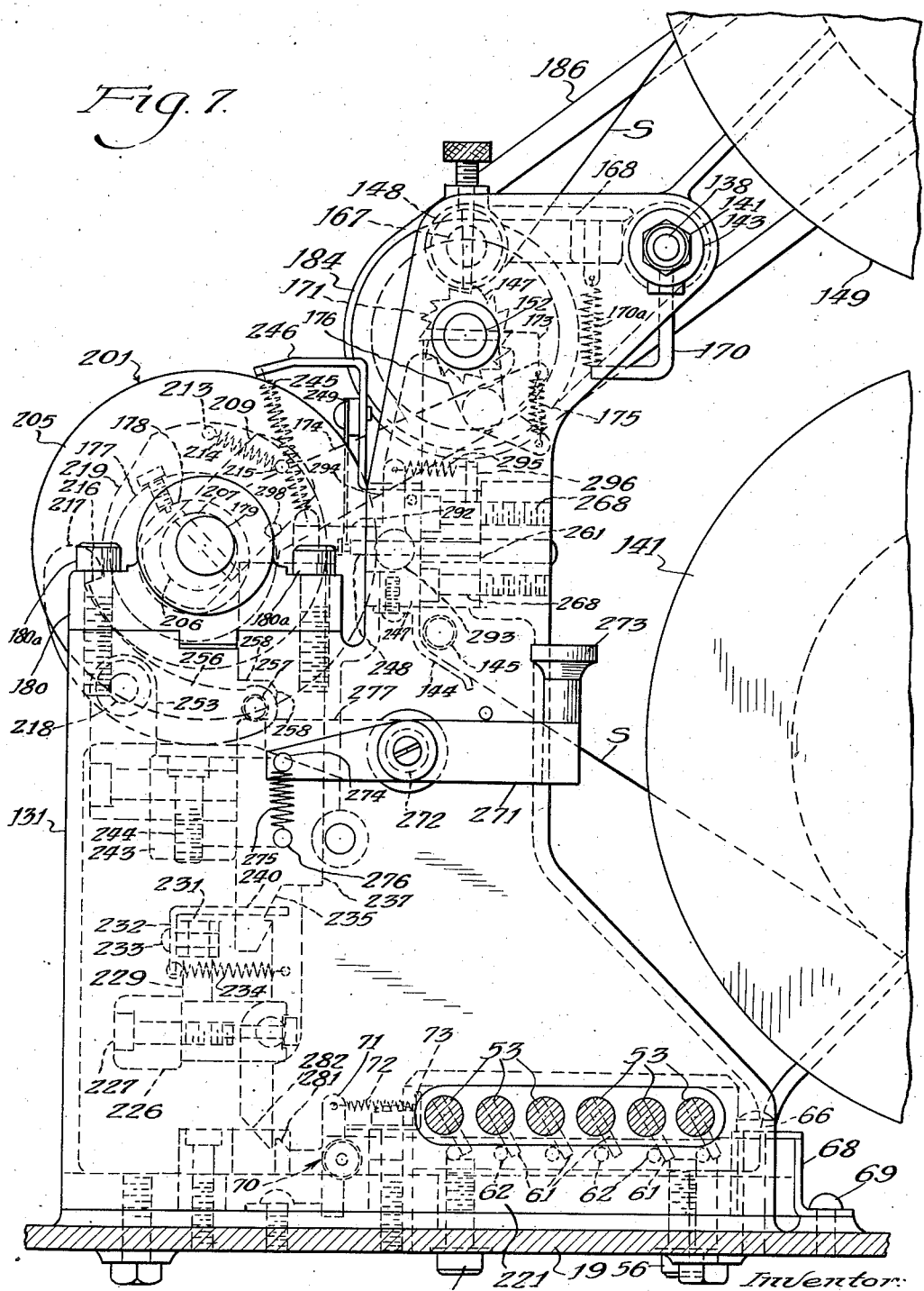
Figure 8:
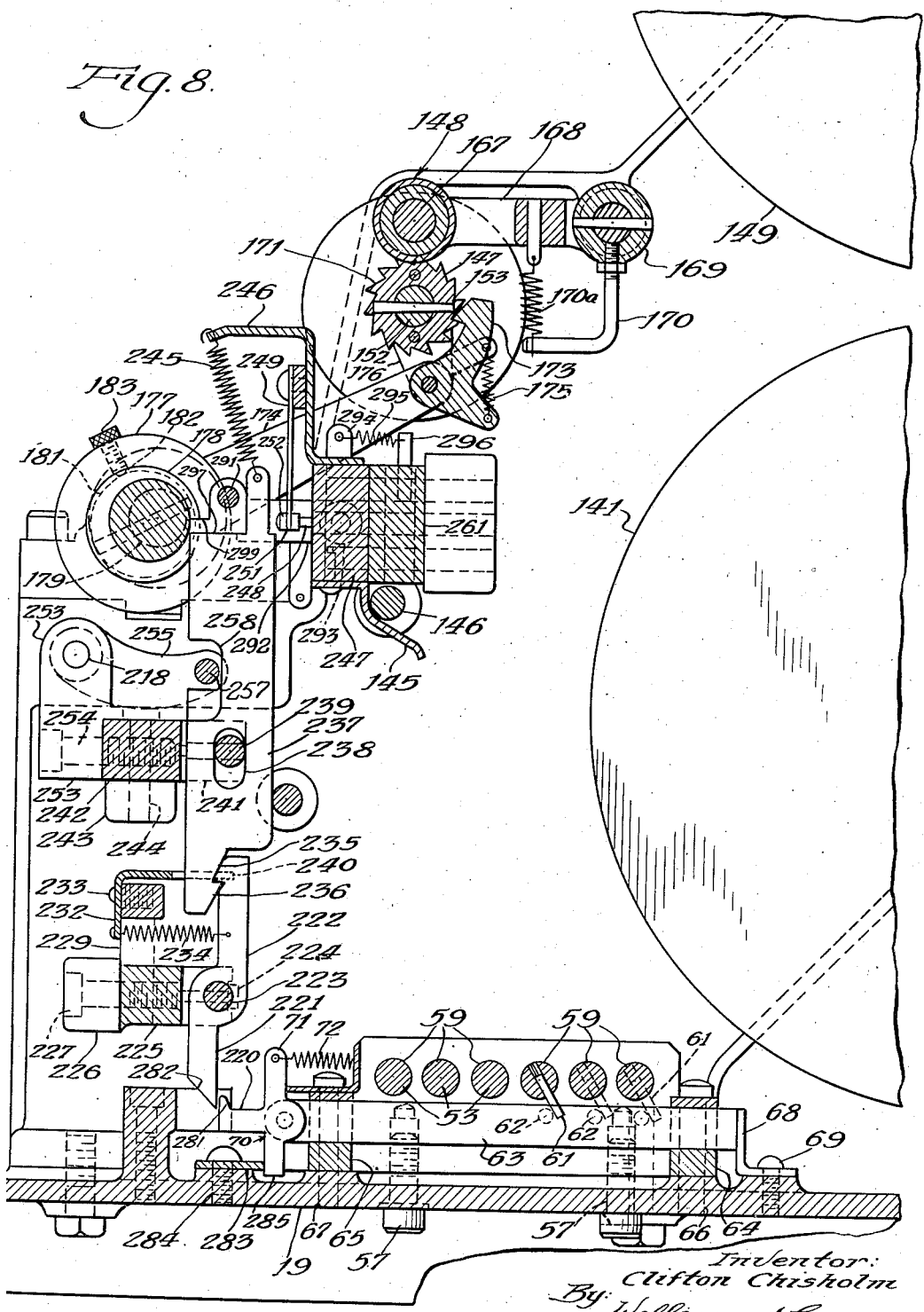

Figs. 4 and 5, taken together, constitute an enlarged front elevational view generally similar to Fig. 3, certain additional details being shown. Fig. 5 adjoins Fig. 4 on the right;

Fig. 6 is an end elevational view of the strip punching mechanism, looking from the right of Fig. 5;

Fig. 7 is a vertical sectional view taken substantially on the line 7—7, Figs. 2, 3 and 5, showing the punching mechanism in elevation;

Fig. 8 is a vertical sectional view of the punching mechanism, taken substantially along the line 8—8, Figs. 3 and 5;

Fig. 9 is a detail sectional view showing special operating elements located between the typewriting machine and the punching mechanism, taken substantially along the line 9—9, Fig. 2;

Fig. 10 is a detail plan view showing the rear portions of the operating elements of Fig. 9;

Fig. 11 is a detail view of certain line spacing control elements taken substantially along the line 11—11, Fig. 2;

Fig. 12 is a vertical sectional view taken substantially along the line 12—12, Fig. 2;

Fig. 13 is a detail plan view, with parts in section, of certain code bars and associated elements taken substantially along the line 13—13, Fig. 5;

Fig. 14 is a detail view of one of the strip feeding rollers;

Fig. 15 is a sectional view of the same roller, taken substantially along the line 15—15, Fig. 14; and Fig. 16 is a view of a section of a perforating strip or tape showing a code which may be employed in my machine.

Figure 1:
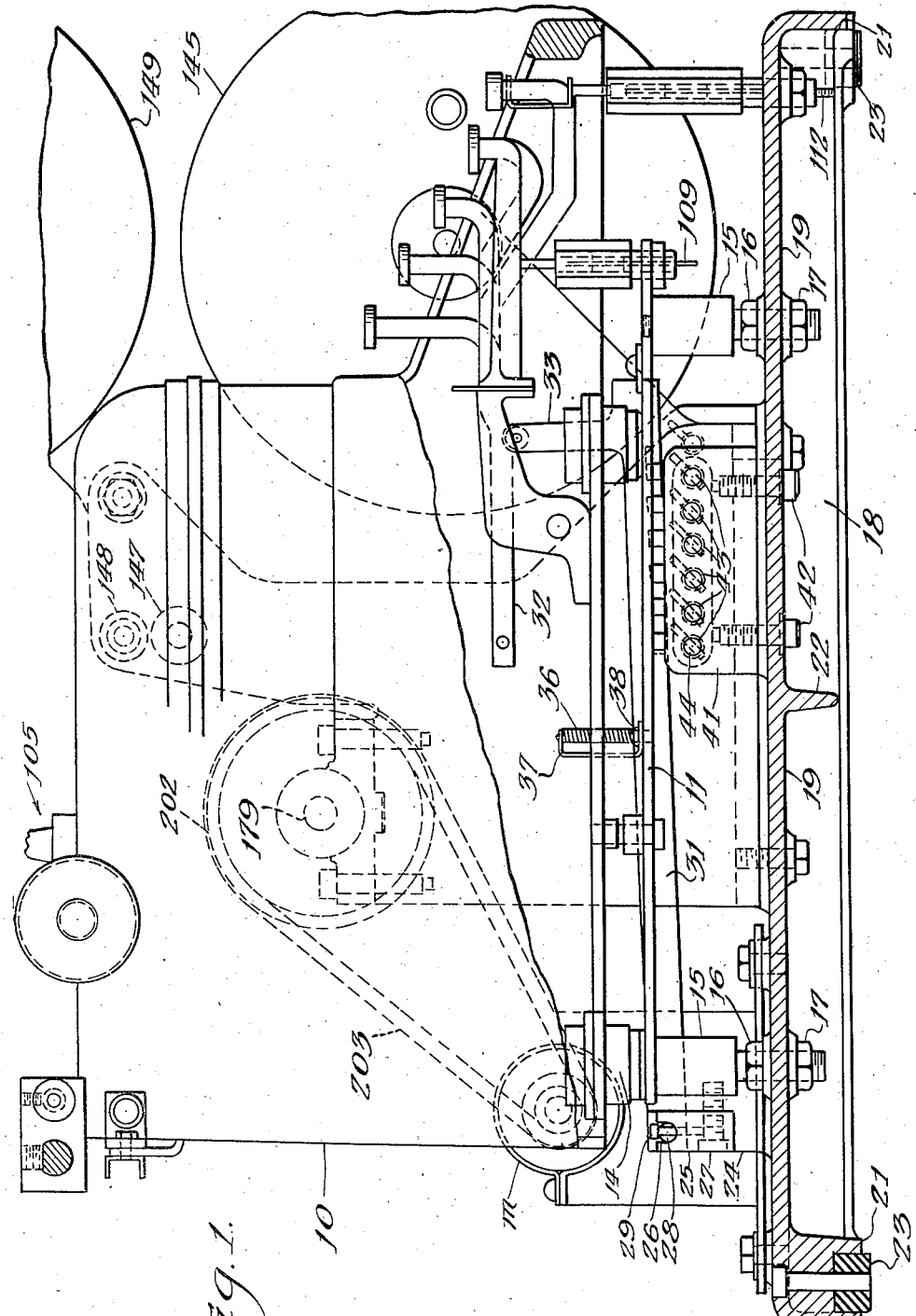
Fig. 1 is an end elevational view of my improved strip perforating apparatus.

Before proceeding with a detailed description of my invention a general outline of its structure and function will be given. As shown in Figs. 1, 2 and 3, a standard typewriter is mounted above a set of movable bars which are notched or cut out according to a code so that each movable bar selectively operates a distinct element or group of elements which ultimately control the perforating elements of a punching mechanism shown at the right of Figs. 2 and 3. The depression of a typewriter key, for example, the letter "a" moves a bar which, as shown in code, Fig. 16, causes four perforating punches of a group of seven to form perforations in a particular spaced relationship. As shown in Fig. 16, seven rows of perforations may be formed in the strip or tape. The middle row of the seven is perforated for every operation of the machine regardless of its nature. This middle row of perforations subsequently may be used as described in my copending application mentioned above for controlling feeding operations of the tape itself in automatic mechanism for controlling a plate embossing machine. The apparatus is so designed as will be more fully pointed out below that any operation of any key or other manual control invariably causes the perforation to be formed along the middle row.

The control strip or tape has six rows of code perforations in addition to the middle row described above. Operation of the key representing "a" on the typewriter causes perforations to be made in the first, third and sixth rows. Operation of the "b" key of the typewriter causes perforations to be formed in the first, second, third and fourth rows and so on. Fig. 16 shows code arrangements for other operations such as word spacing, shifting, carriage return and line spacing. In addition, two operations which are not functions of a standard typewriter must be performed, namely, picking up a plate which is to be accomplished automatically in the plate embossing machine, and the rolling and ejecting of a finished plate. The manner in which these operations are accomplished in the automatic embossing machine is described in detail in my aforesaid copending application but it is important to note here that some means must be provided for indicating such operations on the tape which is to control the automatic embossing machine, otherwise they would not be accomplished.

Proceeding now to a detailed description of my invention, reference is first made to Figs. 1 and 3 of the drawings. A standard commercial typewriter 10 is supported on two parallel bars or plates 11 and 12 which are secured at their front and rear ends to the four supporting feet 13 of the typewriter 10. The normal rubber cushioned feet of the typewriter are replaced by resilient washers 14 in a manner that is obvious. The two bars or plates 11 and 12 are supported by means of studs 15 and adjustable nuts 16 and 17 on a base member 18. The studs and the adjustable nuts 16 and 17 are provided for adjusting or leveling the position of the typewriter with respect to the supporting base and with respect to other operating elements to be described in detail below.

The base 18 consists essentially of a substantially flat and horizontal plate member 19 referred to hereafter as the base proper. This plate member 19 is provided at its marginal edges with downturned flanges 21 and at intermediate points with reenforcing flanges or ribs 22. At appropriate points such as the corners of the frame the downturned flanges may be provided with resilient supporting elements such as feet or pads 23 of rubber or the like. As shown in Figs. 2 and 3, the base member comprises a basic frame work for the machine and extends a short distance to the rear and a considerable distance to the right of the typewriter. The extended portion of the base to the right of the typewriter affords a foundation for a punching or perforating mechanism and elements for operating the same which will be described in detail hereinbelow.

The horizontal plate or base 19 supports two brackets 24 which are preferably integral with the base. A rectangular block 25 having a notch 26 in its upper end is secured to each of the brackets 24 by means of studs 27. The notches 26 are rounded at their lower ends to serve as bearings for a transverse shaft 28 located below the typewriter and extending across the rear thereof. The shaft 28 is held firmly seated in the notches 26 by fastening means such as cap screws 29 or the like.

Pivoted on the shaft 28, and appropriately spaced by spacing means not shown in detail are a series of levers 31. One such lever is provided to underlie each key bar 32 of the typewriter. At its forward end each of the levers 31 is provided with an upstanding arm or extension 33 which bears a pin 34 having an enlarged head 35 spaced from the arm 33 to receive and seat the lower edge of a key bar 32 on the pin 34 between the arm 33 and the head 35. A series of springs 36 have their upper ends secured to a bracket 37 which extends below and substantially across the full width of the typewriter. The bracket 37 is secured to the bars 11 and 12 previously described by suitable fastening means 38. The lower end of each of the springs is secured to one of the levers 31 under tension to hold the arms 33 in contact with the associated key bar 32. By means of the construction just described it is obvious that operation of a typewriter key to depress a key bar 32 depresses the associated arm 33 and bar 31 against the tension of spring 36. The springs 36 are light so that resistance to the operation of the typewriter keys is not substantial. The springs 36 of course cause the arms 33 to be constantly in engagement with appropriate key bars 32, but the typewriter can be readily disconnected from the bars 31 by merely lifting it out of its position.

At the left end of the supporting base 19 a bracket 41 is secured by means of studs 42. The bracket 41 projects upwardly and is provided with a series of holes 43 which serve as bearings for the left ends 44 of a group of rotatable transverse members 45, referred to hereinafter as code bars. Each of the transverse members 45 consists, except for the cylindrical bearing portions at its ends, of a flat bar which normally lies with its surface in an upwardly sloping plane as shown in Figs. 1 and 12.

There are six code bars 45, and they are positioned directly below the levers 31 so that when any lever 31 is depressed, by operation of a typewriter key bar 32 as previously described, the members 45 will be caused to rotate clockwise, as shown in Fig. 12, unless the bar 31 is notched above a code bar 45. The various levers 31 are notched at various points opposite certain of the code bars 45 so that these levers may be depressed without operating those particular code bars. Where the levers 31 are not notched, their downward movement, incidental to the operation of a typewriter key, causes code bars 45 opposite unnotched portions of the levers to be rotated. Various combinations of notched and unnotched portions of the levers 31 make it possible to rotate various combinations of code bars 45. The code bars 45 each control a punching element in a manner to be described hereinbelow. Therefore the operation of any key on the typewriter 10 causes the operation of a particular combination of code bars peculiar to that key and results in punching a group of perforations also peculiar to the key operated, in the control strip or tape which is being fed through the punching mechanism, as will also be described below.

Referring now to Figs. 7, 8, 12 and 13, the code bars 45 are provided at their right ends with tongues 51 which fit snugly in notches 52 formed in aligned shafts or bars 53 which form, in effect, continuations of the code bars 45. The tongue and groove connection just described permits easy disconnection of the punching unit as will appear more clearly as this description proceeds, and the shafts 53 are constrained to rotate with the code bars 45.

A pair of upstanding brackets 54 and 55, Figs. 3 and 5, are secured to the base 19 by suitable means such as studs 56 and 57. These brackets are provided with suitable openings to provide bearings 58 and 59 for the shafts 53, as best shown in Figs. 8 and 13. Appropriate journal portions 59 are provided on right ends of the shafts 53, and the bars 45 have their right end portions bearing tongues 51 mounted for rotation in the bearing openings 58 of the bracket 54, the left ends of shafts 53 also being mounted therein as shown in Fig. 13.

Each of the shafts 54 carries a radially projecting pin 61 which is adapted to engage a pin 62 projecting to the right of a slidable bar 63, one bar 63 thus being adapted to be moved rearwardly of the machine, or to the left as shown in Fig. 12 when the shaft 53 associated therewith is rotated clockwise.

The sliding bars 63 are mounted for sliding movement in two slotted brackets 64 and 65 which are secured to the base 19 by suitable fastening means such as the screws 66 and 67. A stop plate 68 is secured to the base 19 by securing means such as screws 69 in position to limit movement of the sliding bars 63 forwardly or to the right as seen in Figs. 12 and 13. An upstanding arm or ear 71 is provided on a three armed lever 70 pivoted to the rear end of each of the sliding bars 63 and a spring 72 has one end connected to the ear 71 and the other end to a fixed bracket 73. Bracket 73 is secured to bracket 65 and the spring continually urges each of the three armed levers clockwise and the sliding bars forwardly or to the right, Fig. 12, against the stop plate 68. Hence depression of a typewriter key and consequent rotation of a shaft 53 in a clockwise direction moves the sliding bar 63 associated with such shaft rearwardly or the left against the tension of the spring 72. On release of the key, the spring quickly restores the sliding bar 63 to its forward position with its forward end in abutment with the stop plate 68. The three armed lever has other functions which will be described below.

Before proceeding with a description of the punching mechanism per se it should be pointed out that in addition to the key bars of the typewriter which correspond to character keys, there are several other controls which must be coded into the perforated strip to obtain proper operation of the plate embossing machine under the control of the strip. These are the shift key mechanism, whereby a shift from lower case to upper case in the typewriter is to be duplicated on the embossed plate, the word spacing bar, the carriage return, and the line spacing mechanism associated with the typewriter carriage. In addition, two operations peculiar to plate embossing machines should be indicated on the control tape, if fully automatic plate embossing is to be achieved, although such operations are not employed in ordinary typewriter operation. These are a plate feeding operation or pickup, and a plate ejecting and plate rolling operation.

Means for setting such operations into the code bars 45 and their extensions, shafts 53, will next be described.

For the six operations named, six levers 81, 82, 83, 84, 85 and 86 are provided between the typewriter and the punching mechanism, as best shown in Fig. 2. These levers are pivoted at intermediate points on a shaft 87 mounted in upstanding brackets 88 secured to the base 19 by studs 89. Screws 91 hold the shaft 87 firmly seated in notches in the tops of brackets 88 in a manner similar to the mounting of shaft 28 described above.

Rearwardly of the pivot point a tension spring 92 secured between each of the levers 81 to 86, inclusive, urges each lever to a counterclockwise position limited by contact of the extreme rear end of each lever with a bracket 94 as shown in full lines in Fig. 12.

Four of the six levers mentioned, namely levers 81, 83, 84 and 85, Fig. 9, are operated by Bowden cables which are connected to the rear ends of said levers and operated from mechanisms in or associated with the typewriter. The other two levers, 82 and 86 are provided with operating keys. Thus lever 81 associated with the carriage return is operated by a Bowden cable 101 which leads to a block 102, Fig. 2, and carries a button 103 which is pushed inwardly when the carriage is returned to position for beginning a new line. Lever 83 is operated by a Bowden cable 104, the other end of which is connected to the line spacing mechanism 105 of the typewriter. As shown in Figs. 2 and 11, the line space lever carries a downwardly projecting pin 106 which acts on the end of a horizontal sliding pin 107 mounted in a block 108 in contact with the end of Bowden cable 104. The sheath of Bowden cable 104 is anchored to the typewriter carriage and carried by the carriage in such a manner as to be operable at any carriage position. The lever 84 is operated by a Bowden cable 109 having its other end connected to the shift mechanism 111 of the typewriter by which the type basket, or the carriage, depending upon the typewriter used, is shifted to type upper case rather than lower case characters. The lever 85 is operated by Bowden cable 112 which has its other end connected to the space bar 113 of the typewriter.

It will be understood of course that the ends of the sheaths of all the Bowden cables just described are suitably anchored to fixed members or at least to members which are fixed with respect to the control element connected to the cable. As shown in Fig. 9 the lever end of each of the cables 101, 104, 109 and 112 is engaged to a slidable pin inserted through an appropriate bore in the block or bracket 115. The cable sheaths are anchored to the block 115 which is rigidly secured to the base 19 by fastening means such as the studs 116. The block 115 is provided with vertical bores 117, 118, 119 and 121. The Bowden cable connections are guided for vertical movement, the pins being indicated at 122, 123, 124 and 125. Movement of the typewriter carriage to the right, in position for starting a new line causes Bowden cable 101 to push pin 122 upwardly in the bore 117 rocking lever 81 clockwise to a position similar to the position of lever 82 as shown in dotted lines, Fig. 12. The levers 83, 84 and 85 are operated in a similar manner.

The front ends of the levers 81 to 86 are guided for vertical movement by a comb member 126 secured to the base 19 by appropriate means such as screws 127. A vertical slot is provided for each of the levers.

The lever 82 is arranged to rotate certain of the code bars 45 to cause the punching mechanism to punch a group of perforations in the control strip or tape, according to the predetermined code. The purpose of this operation is to form control perforations in the control strip which will set in operation mechanism in a plate embossing machine to pick up a plate to be embossed and feed it to punching position. The particular means by which a plate is thus picked up and carried to the embossing dies forms no part of the present invention. It is sufficient to point out that whenever operations on one plate have been completed it is necessary to feed in a new plate and manual depression of the lever 82 will cause the punching mechanism to form control indicia in the tape which will initiate such action when the embossing machine is operating under control of the tape. All the levers including lever 82, have notches as 129 cut into their lower edges opposite all code bars 45 which are not to be rotated by that particular lever.

In a similar fashion, the lever 86 operates certain code bars to cause control indicia to be perforated into the tape which will set in motion mechanism in the plate embossing machine to eject the finished plate, roll it smooth to eliminate any minor distortions arising from the embossing operations, and carry it to a suitable receiver such as a stacking or packaging device. The means for ejecting, rolling and stocking of course form no part of the present invention.

Referring now to Figs. 2, 3, 5, 6, 7, and 8, the punching mechanism will next be described. Two vertical frame members 131 and 132 form the side frames of the punching mechanism. The left frame member 131 is provided with a horizontal flange at its base which rests on the base 19, being secured thereto by means such as studs 133. The right frame member 132 has a similar base flange 135 which is secured to the base 19 by means such as studs 136. The upper portions of the frame members are held rigidly in properly spaced relationship by a tie bar 137 having reduced end portions 138 and 139 which pass through openings in the frame members. The reduced end portions of the shaft 137 are threaded to receive nuts 140 which hold the frame members rigidly in position against the shoulders where the reduced end portions join the bar 137 proper.

A supply reel 141 for the strip or tape to be perforated is mounted on a shaft 142 carried by the frame members 131 and 132. A spring 143, having one end fixed in a collar 144 secured to shaft 142, presses against one side of the supply reel 141 to prevent undesirable unreeling. The strip to be perforated is led from the supply reel 141 over a stationary guide member 145, Figs. 7 and 8, and under a guide roller 146 through punching dies to be described in detail below. From the punching dies the strip is led to a pair of feed rollers comprising driven feed roller 147 and a rubber covered pressure roller 148, and thence to a rewinding roll 149 mounted on a shaft 151 carried by the upper portion of frame member 132.

The driven feed roller 147 is fixed to its shaft 152 by means of a tapered pin 153. As best shown in Figs. 14 and 15, the feed roller 147 consists of a cylindrical body portion 154 having lightly knurled circumferential bands 155 and 156 near each end to obtain, in cooperation with the resilient covering on roll 148, a positive grip on the strip S of paper or the like. End flanges consisting of discs 157 and 158 of diameter somewhat larger than that of the cylindrical body 154 are secured to the ends of body 154 by means such as screws 159. The shaft 152 is mounted in bearings provided in the frame members 131 and 132 and on its outer right end it carries a knurled hand wheel 160 and a notched disc 161 rigidly secured thereto as by means of a set screw 162. A detent lever 163, pivotally mounted on a stud 164 secured to the frame member 132, is normally urged by a spring 165 to a position where a detent nose 166 on said lever fits neatly into a notch on the disc 161. This detent tends to insure that the roller 147 will be turned in equal increments to provide uniform spacing between successive perforations or groups of perforations in the strip S.

By means of the knurled hand wheel 160 the roller 147 may be turned manually to advance the strip or tape S. This is particularly useful when a new strip is being fed into the machine.

Cooperating with the feed roller 147 is the pressure roller 148 which is mounted in two arms 167 of a yoke 168. The yoke 168 is pivotally mounted on a tie bar 137 previously described which in turn is fixed to the frame members 131 and 132. A collar 169 is keyed to the tie bar and bears a depending arm 170 to which a tension spring 170A is attached. The other end of the spring 170A is attached to the underside of the yoke so as to pull the roller 148 into engagement with the feed roller 147 thereby affording sufficient friction to feed the tape positively upon rotation of the fed roller 147. The roller 148 may be lifted manually against the tension of spring 170A to facilitate feeding in a new strip.

At a point on shaft 152 between the feed roller 147 and the frame member 132 a toothed ratchet wheel 171 is secured to the shaft 152 for rotation therewith. A tapered pin 172 as shown in Fig. 5 may be used for this purpose. A pawl 173 pivoted on the forward and upper end of a reciprocable link 174 is urged into engagement with the teeth of ratchet wheel 171 by means of a spring 175, Fig. 8. The upper end of the link 174 is pivotally connected to an arm 176 which is freely mounted on the feed roller shaft 152. The lower end of the link 174 is enlarged to form a circular band as shown at 177. The interior of the band 177 receives and closely fits an eccentric 178 carried by and secured to a main operating shaft 179. The shaft 179 is operated cyclically in a manner to be described below and is mounted in suitable bearings 180 and 180' secured by studs 180A to the frame members 131 and 132. The outer periphery of the eccentric 178 is provided with a circumferential groove 181 about midway between its side faces. The reduced tip portion 182 of a set screw 183 carried by the band 177 previously referred to fits freely into the groove. This construction permits rotation of the eccentric 178 inside the band and consequently effects reciprocation of the link 174 but at the same time prevents axial displacement of the band. Hence with each cycle of operation of the shaft 179 the link 174 is reciprocated and the pawl 173 carried thereby engages a new tooth on the ratchet wheel 171 and advances the feed roller shaft 152 through an arc determined by the spacing between successive teeth on the ratchet. This arc of course is also represented by the spacing between teeth on the detent wheel 161, Fig. 6, previously referred to. The rocking arm 176 swings about shaft 152 as the link 174 is reciprocated, keeping the pawl 173 in proper position with respect to the ratchet wheel 171.

The shaft 152 of the feed roller also carries a pulley 184 secured against relative rotation by means of a key 185. A belt 186 passes about pulley 184 and another pulley 187 on the spindle or shaft 151 of the rewind reel 149. A spring 188 has an end 189 bent at right angles and secured in an opening in the pulley 187 to constrain the spring to rotate with the pulley. The spring is under compression when a reel 149 is in place, the reel being held in place by a suitable detent 191 on the outer end of the spindle. Friction between the spring and the adjoining face of the reel causes the reel to rotate with the spring to take up slack in the strip S and keep it taut. A handle 192, Fig. 2, is provided on the rewind reel for manual rotation; as may be convenient in starting a new strip through the machine.

The shaft 179, which operates the eccentric is designed for cyclic operation and at its right end a friction brake 193 is secured to prevent overthrow. This brake consists of a split ring 194 adapted to be tightened about shaft 179 by means of a bolt or screw 195. A spring 196 surrounding the bolt holds it by friction in any adjusted position.

The shaft 179 which operates the strip feed mechanism described above also operates the punching or perforating elements to be described in detail hereinbelow. The shaft 179 is driven through a one revolution clutch 201 which includes a pulley element 202, by means of a belt 203 passing about the pulley element 202 and a pulley 204 on the shaft of a suitable motor M, mounted on the base 19 as shown in Fig. 2.

The one revolution clutch is preferably a roller clutch of a type well known in the art. As shown, Figs. 2, 5 and 7, it includes a hollow cylindrical housing or drum 205 which is grooved to form the pulley element 202, and which is freely rotatable on the shaft 179. An eccentric sleeve 206 is rigidly secured to shaft 179 as by a key 207. An arm or shoe 208 is adapted to engage the inner surface of the hollow drum 205 and comprises radial portion 209 which is secured to the shaft. A torsion spring 210, Fig. 2, tends to urge the arm member to clutch engaging position.

The clutch may also comprise a cam disc 211 mounted on an extension 212 of the eccentric sleeve 206, which has a pin 213 near its outer periphery and projecting to the right, Fig. 5. A tension spring 214 is connected to this pin; the other end thereof being connected to a similar pin 215 projecting from the radial portion of arm 209. The cam disc 211 has a shoulder 216 adapted to be engaged by a locking pawl 217 fixed on a rotatable shaft 218.

When the pawl 217 is rocked counterclockwise, Fig. 7, by means described below, the disc 211 is released and tension on the spring causes relative rotation between the cam and the arm 208. As a result, the driven member of the clutch is connected in driving engagement with the drum 205 which is constantly rotating. After initial release, the nose of pawl 217 rides on the periphery of cam 211. As the cam plate 211 nears the end of a revolution, a declining surface 219 thereon permits the pawl to move clockwise so as to catch on the shoulder 216 and stop further rotation of the cam. This action tensions spring 214 and releases the driven clutch member from frictional driving engagement with the rotating drum 205. This operation is repeated for each cycle.

It will be recalled that a group of six sliding bars 63 are provided, each controlled by an arm 61 projecting radially from a code bar extension 53, mounted in the brackets 54 and 55. These sliding bars are mounted for horizontal movement and are held properly spaced by the slotted brackets 64 and 65 previously described. As shown in Fig. 8 the three armed lever previously mentioned, carried by each of the sliding bars, comprises a pawl or nose portion 220 adapted to contact depending arm 221 of a rocker 222 pivotally mounted on a shaft 223. Shaft 223 is secured as by screws or studs 224 to a bar 225 which may be fastened to lugs 226 on the frame members 131 and 132 by studs as 227. The bar 225 is provided with a pair of upwardly extending studs 228 and 229 which carry a short bar 231. A bracket 232 is secured to the bar 231 by suitable means such as fastening screws 233. Tension springs 234 are secured at one end to the bracket 232 and at their other ends to the rockers 222, one spring being secured to each rocker and tending to rotate said rocker counterclockwise as seen in Fig. 8.

Each of the rockers 222 has a latch portion 235 on its upper end, adapted to engage a similar latch portion 236 on a vertically slidable bar 237, one bar being provided for each of the six rockers and one additional bar, without latching elements, being provided for a purpose to be described below, making seven bars in all. The bars 237 are provided with slots 238 near their lower ends and a rod 239 passes through said slots, permitting vertical sliding movement and limited rocking movement of the bars. The bracket 232, previously mentioned, extends upwardly and forwardly over the bar 231 terminating in a comb member 240 which guides the slides 237 and keeps them in properly spaced relationship. The rod 239 is mounted in lugs 241 projecting from a transverse bar 242 which in turn is attached to lugs 243 by suitable fastening means such as studs 244.

Each of the slides, except the seventh one which is located in the middle of the group, is provided on its upper end with an upwardly projecting ear to which a tension spring 245 is connected. The other end of each spring 245 is secured to the upper arm of a Z shaped bracket 246, the lower arm of which is secured to a rigid block 247 which forms a guide for a row of seven punching pins 248. The bracket 246 also carries a comb of leaf springs 249. The lower end of each spring 249 is bifurcated to engage a groove 251 in the head 252 of each of all seven punch pins, to urge the pins to a definite position at the left as seen in Figs. 7 and 8.

Movement of any one of the slides 63 to the left, Fig. 8, rotates the latching rocker 222 clockwise and releases the associated slide bar 237 for vertical movement under the influence of its spring 245.

As seen in Figs. 7 and 8, the shaft 218 which carries the latching pawl 217 for the clutch mechanism described above is mounted in spaced brackets 253 secured as by studs 254 to the bar 242 previously described. The shaft 218 which carries the pawl 217 at one end, carries an arm 255 at its opposite end. This arm, together with a depending extension 256 of the pawl 218, carries a bail member 257 which extends across all seven of the slide bars 237.

Each of the slide bars 237 is provided with a notch 258 which engages the bail member 257. These notches are of such width vertically that upward movement of one or more slide bars 237 may lift the bail 257 sufficiently to release the latch 217, without disturbing the other bars. Hence upon movement of a slide bar 63 to the left, Fig. 8, latch 222 is rotated clockwise, a bar 237 moves upwardly lifting bail 257 and rocking the locking pawl 217 counterclockwise, Fig. 7, to initiate a single complete revolution of the shaft 179 by the clutch and drive means previously described.

Slide bars 237, in addition to serving as clutch releasing elements, serve as interposers between the eccentric sleeve 206 keyed to shaft 179, and the punch pins 248. As previously noted bars 237 are capable of limited pivotal movement about shaft 239. In their lowered or latched position, the six bars associated with the six slides 63 are ineffective to serve as interposers. When unlatched or raised, on the other hand, the bars are interposed between the eccentric member 206 and the associated punch pin and a rotation of the eccentric operates the punch to perforate the strip S.

Hence the release of any slide 237 trips the clutch for one revolution of the shaft 179 and the same release interposes the slide before its associated punch pin. Selective rotation of the code bars 45 and their extensions 53 therefore results in operation of corresponding punch elements.

As best shown in Fig. 8, a female die member 261 is provided for cooperation with the punch pins 248. The die 261 is so mounted with respect to the block 247 which carries the punch pins that the tape or strip S may be fed between the female die and the punch pins when the punches are withdrawn. A rigid bar 262 is secured to lugs 265 and 266 on the frame members 131 and 132 by means such as studs 267. This bar which is sufficiently heavy and rugged to support the punching dies for operation by the eccentric on shaft 179 carries the entire die assembly. The paper guide 145 previously described and the Z-shaped bracket 246 to which springs 245 and 249 are attached are also carried by this assembly, being secured by appropriate fastening means to the block which carries and guides the perforating pins or punches 248.

The middle bar 237, as previously noted, is not latched down by a latch 235 nor is it urged upwardly by a spring such as 245. Therefore this bar is ineffective to trip the clutch and operate the punching mechanism, although it is always in interposition between the eccentric 206 and its punch pin 248. Hence the middle one of the seven punch pins is always operated when the clutch is tripped, so that a perforation is made at every feeding stop of the strip S. The purpose of this is to provide a feed control perforation at every stop, to govern the operation of machinery which will later be controlled by said strip.

Obviously it may be desirable to operate the middle punch pin at times without operating any of the other punch pins but no automatic operating means are provided for such a case. However, manual means comprising a pivoted lever 271 fixed to a rotatable shaft 272 mounted in the frame member 131 are provided for releasing the clutch and operating the middle or "feed" punch. A finger key 273 is provided on lever 271 and the opposite end of said lever bears a pin 274 to which is attached a tension spring 275. The lower end of spring 275 is secured to a pin 276 secured to frame member 131 and urges the lever counterclockwise, Fig. 7.

The shaft 272 which carries the lever 271 also carries an arm 277 fixed to said shaft, and normally resting on the top of bar 242, thus limiting counterclockwise movement of shaft 272. Upon manual depression of the key 273, the arm 277 is raised to lift the bail 257, release the pawl 217 and initiate one revolution of the shaft 179. This operation punches a central perforation in strip S and advances the strip one step in the manner previously described. The punching operation takes place early in the cycle, with the strip advancing movement occurring during the last half of the cycle.

After a punching operation involving the release of any of the latches 235 has been performed, it is necessary to reset the various parts for a new cycle of operation. The springs 72 draw the horizontal slides 63 forwardly or to the right, Fig. 5 as previously described, cooperating sloping surfaces 281, 282 on the rocker 222 and the pawl 220 permitting the pawl to yield counterclockwise and bypass the arm 221. A plate 283 is secured to the base 19 by screws 284 and a depending arm 285 of each three armed lever previously mentioned contacts the right edge thereof under influence of the spring 72. With this arrangement the spring 72 may be very light and still be sufficiently quick and positive in action to permit rapid operation.

The slides 63 are of course restored immediately after release of a typewriter key (or one of the levers 82 or 86). The vertical slides, or selectors, 237 are restored to their lower latched positions against the tension of springs 245 by a restoring bail 291 carried by the horizontal arm of a bell crank 292 pivoted to the guide block 247 of the punching mechanism at 293. The other arm 294 of the bell crank 292 extends vertically and a spring 295 is attached thereto, the other end of the spring being anchored to a pin 296 mounted in the guide block 247. This spring tends to rotate the bell crank clockwise and to hold the bail 291 in its upper position out of contact with horizontal shoulders 299 on the slides 237.

A pin 298 carried in the right end of the eccentric sleeve 206 which operates the punching dies, is adapted during the latter part of an operating cycle, and after punching has been accomplished, to strike a horizontal shoulder 299 at the rear end of the bell crank lever arm 292, see Fig. 8. As the shaft 179 continues to rotate, the arm 292 is forced downwardly and the bail 291 restores all the vertical slides 237 to their latched positions. Shortly thereafter, the cycle is completed and shaft 179 comes to rest until it is tripped for another operation by actuation of a typewriter key or one of the other control keys described above.

It will be noted that although all the apparatus described above is controlled directly by the operation of the keys and other manual controls of a standard typewriter that the typewriter may be used in the normal manner even while connected to the operating mechanisms of the punching or perforating mechanism. Hence if it is desired to type the same matter on sheets of paper as is to be represented in code on the control strip or tape S for subsequent control of a plate embossing machine, both operations may be accomplished simultaneously. In other words, the typewriter may be used for ordinary typing and all the operations involved in such typing be transmitted simultaneously in code to the control strip or tape for subsequent use.

In view of the above it is apparent that mailing lists may be typed as rapidly as may be desired or as rapidly as the operator of the typewriter is able to function. The coding operations impose very little operating tension or resistance on the various keys and controls of the typewriter above that normally imposed in standard typewriters. Hence it is possible for the typist to proceed as in normal typing at speeds which may approach the order of 100 words per minute. Hence this is much faster than the plate embossing machine can be operated manually or automatically and results in the rapid perforation of control tape. The tape will be fed at a slower rate of speed when subsequently employed in automatic control of the plate embossing machine due to operating limitations. Such use, as previously indicated, forms no part of the present invention but it is emphasized that the relatively slow performance of the embossing machine may be compensated for, largely by providing for its continuous operation and it offers no impediment to the rapid preparation of the type by use of the present invention.

In order to permit rapid operation of the typewriter and consequently of the strip perforating mechanism described above, the motor M and the parts driven thereby should be so proportioned that the shaft 179 may be operated at a fairly rapid speed. For example, if the shaft 179 is adapted to be driven cyclically at speeds of the order of 600 revolutions per minute, typing may proceed at a rate of approximately 100 words per minute which is usually as fast as the most capable typist can operate a typewriter. In any event the speed of the shaft 179 should be sufficient that operation of the typewriter at maximum speed will not exceed the rate at which the perforating or punching operations may be taken care of.

In view of the foregoing it is evident that my invention makes possible the employment of standard typewriters, available in all business offices, to control subsequently and automatically the operations of other keyboard machines which are heavier and more ponderous in character and which if not automatically controlled would consume a great deal of time and labor and constitute serious bottlenecks in the operation of efficient business systems.

Although I have described my invention specifically as being designed and intended to be used in preparing a perforated strip or tape S which will subsequently be used for controlling a plate embossing machine, it will be obvious that the use of such tape or strip is not limited to the control of a specific apparatus. A tape or strip perforated by the means and in the manner described hereinabove may obviously be used in connection with other machines and operations. Communications equipment transmitting data, typewritten material for example, by wire or radio may be controlled by the perforated strips. It is contemplated that typewriters and other species of recording equipment may be similarly controlled. The use made of the strip or tape S is not to be limited to plate embossing equipment although I have specifically mentioned such use because the apparatus which comprises the present invention is admirably adapted thereto. The embossing of plates, as indicated above, is a costly and time consuming operation which my apparatus greatly simplifies, but my apparatus may be used for many other purposes, wherever initial forming of a tape under typewriter control is practicable and desirable.

Thus, while I have illustrated and described the preferred embodiment of my invention, it is to be understood that this is capable of variation and modification and I therefore do not wish to be limited to the precise details set forth but desire to avail myself of such changes and alterations as fall within the purview of the following claims:

I claim:

1. In a machine for forming perforations in a strip according to a predetermined code, the combination which comprises manual control elements, a series of code control means selectively operable by said manual elements in accordance with said predetermined code, a series of latches each adapted to be released by one of said code control means, an interposer associated with each of said latches adapted to be held normally by said latch in an inoperative position, a punch associated with each of said interposers, punch operating means spaced from said punches, said interposers being adapted to be moved into operative position between said punch operating means and said punches upon release of said latches.

2. In a machine for forming perforations in a strip according to a predetermined code and under the control of the keyboard of a standard typewriter, the combination which comprises a group of levers each operable by depression of a typewriter key, a series of code bars selectively operable by said levers according to said predetermined code, a latch operated by each of said code bars, an interposer normally latched in an inoperative position by each of said latches and urged to an operative position when unlatched, a punch associated with each of said interposers, punch operating means effective through said interposers to operate said punches when said interposers are in operative positions and otherwise ineffective, and means for feeding a strip into position to be perforated by said punches.

3. In a machine for forming perforations in a strip according to a predetermined code and under the control of the keyboard of a standard typewriter, the combination which comprises a group of levers each operable by depression of a typewriter key, a series of code bars selectively operable by said levers according to said predetermined code, a latch operated by each of said code bars, an interposer normally latched in an inoperative position by each of said latches and urged to an operative position when unlatched, a punch associated with each of said interposers, and punch operating means effective through said interposers to operate said punches when said interposers are in operative positions and otherwise ineffective.

4. The combination claimed in claim 3 wherein said punch operating means comprises an eccentric.

5. The combination claimed in claim 3 wherein said punch operating means comprises an eccentric and a single revolution clutch for operating said eccentric in cycles.

6. The combination claimed in claim 3 wherein said punch operating means comprises an eccentric, a single revolution clutch for operating said eccentric in cycles, and a clutch release operable by movement of an interposer to operative position.

7. In a machine for recording the operations of a typewriter or the like, the combination which comprises a group of perforating means, a corresponding group of control elements, one element being associated with each perforating means, means effective upon the actuation of any typewriter key or other manual control device to operate selected of said control elements, means effective upon such operation to initiate a power cycle and operate selected perforating means corresponding to said selected control elements, and additional control means to record operations in addition to those of a standard typewriter.

8. In a machine for recording the operations of a typewriter or the like by code perforations on a strip of paper or the like, the combination of a pivoted bar adapted to be moved by actuation of a manual element on said typewriter or the like, a group of code control elements adapted to be selectively moved by said bar, said bar being formed to move only those code control elements corresponding to code-representing perforations corresponding to said manual element, a group of punches corresponding to said group of code control elements, operating means normally ineffective upon said punches, and means rendered effective by each of said selected code control elements to operatively connect corresponding punches to said operating means.

9. In an apparatus for recording the operations of a typewriter or the like by code perforations in a strip, the combination of a series of pivoted bars operatively connected to the manual controls of said typewriter or the like, a group of code bars selectively operable by said pivoted bars, a slide member operable by each code bar, a latch adapted to be released by each slide, and interposer normally latched in inoperative position by each latch and adapted upon release to move to an operative position, a punch associated with each interposer, and operating means effective through any interposer in operating position to cause the punch associated with such interposer to form a perforation in said strip.

10. The combination recited in claim 9 wherein said operating means is cyclic.

11. The combination recited in claim 9 wherein said operating means is cyclic and wherein means for releasing said operating means for a cycle of operation are operated by movement of an interposer to operative position.

CLIFTON CHISHOLM.

REFERENCES CITED

The following references are of record in the file of this patent:

UNITED STATES PATENTS

| Number | Name | Date |
|---|---|---|
| 1,777,055 | Thompson | Sept. 30, 1930 |
| 2,059,253 | Lasker | Nov. 3, 1930 |
| 2,161,564 | Fitch | June 6, 1939 |
| 2,165,237 | Doty | July 11, 1939 |
| 2,172,754 | Lasker | Sept. 12, 1939 |
| 2,183,820 | Nelson | Dec. 19, 1939 |
| 2,252,852 | Hoover | Aug. 19, 1941 |
| 2,275,615 | Doty | Mar. 10, 1942 |
| 2,346,267 | Mills | Apr. 11, 1944 |
| 2,355,297 | Holt | Aug. 8, 1944 |
| 2,392,275 | Throlstrup | Jan. 1, 1946 |